May 19, 1953  J. K. PARK ET AL  2,638,727
SWEET POTATO DIGGER

Filed Sept. 5, 1951  2 Sheets-Sheet 1

INVENTORS
JOSEPH K. PARK
MITCHELL R. POWERS
BY Ralph B. Stewart
ATTORNEY

May 19, 1953  J. K. PARK ET AL  2,638,727
SWEET POTATO DIGGER

Filed Sept. 5, 1951  2 Sheets-Sheet 2

INVENTORS
JOSEPH K. PARK
MITCHELL R. POWERS

BY Ralph B. Stewart
ATTORNEY

Patented May 19, 1953

2,638,727

UNITED STATES PATENT OFFICE 2,638,727

SWEET POTATO DIGGER

Joseph K. Park and Mitchell R. Powers, Clemson, S. C., assignors to The Clemson Agricultural College of South Carolina, Clemson, S. C., a corporation of South Carolina Application September 5, 1951, Serial No. 245,203

9 Claims. (Cl. 55—139)

This invention relates to a machine for digging potatoes and especially sweet potatoes.

The broad object of the invention is to devise a machine to expose or raise to the top of the ground a maximum number of potatoes with a minimum amount of bruising.

Another object is to devise a machine for digging sweet potatoes in which means are provided for cutting and removing the potato vines in advance of the plowing operation, whereby the complete digging operation is accomplished by only one coverage of the field.

There are no commercial machines available which growers consider satisfactory for harvesting sweet potatoes. Irish potato diggers are sometimes used and although they successfully bring the potatoes to the top of the soil, bruising is so severe that very few growers are willing to use them. Moldboard plows and middlebusters normally used do not cause excessive bruising but expose only about 65% of the potatoes so that it is necessary for the field crew to scratch out the remainder by hand. The digger of our invention exposes approximately 95% of the potatoes with negligible bruising.

Our improved digger is built around a tractor-drawn middlebuster, modified by an extension on each side of the plow point, clipping the wings, and the addition of a series of rods which catch the soil and potatoes from the plow and sift the potatoes to the top. The machine also incorporates attachments for removing vines, since vine removal is essential to prevent clogging of the plow. The vine removal equipment consists of a vine cutter mounted on the tractor and a pair of discs which move the vines from the top of the bed so that they pass under the side rods.

Figure 1:
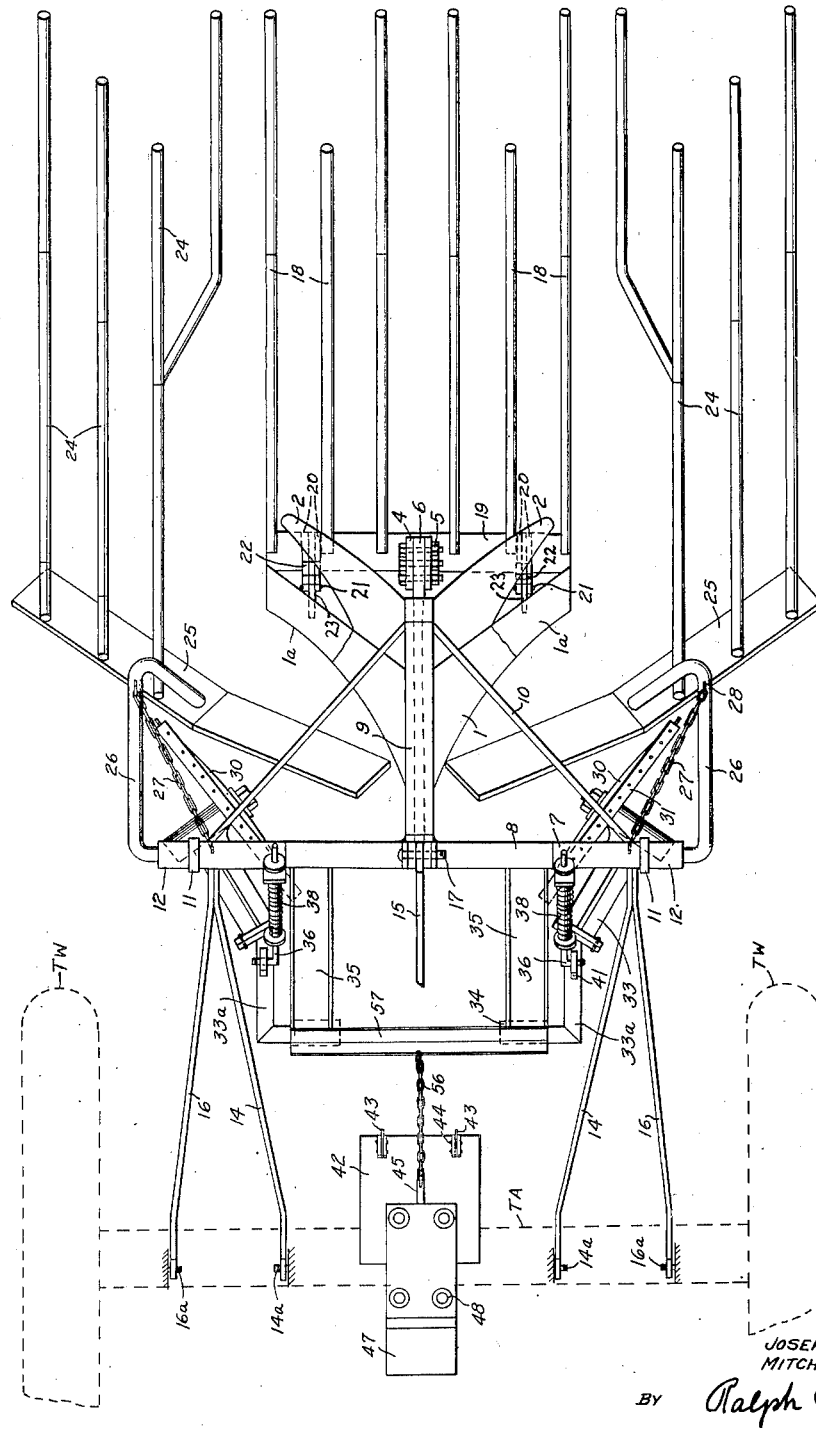
Figure 2:
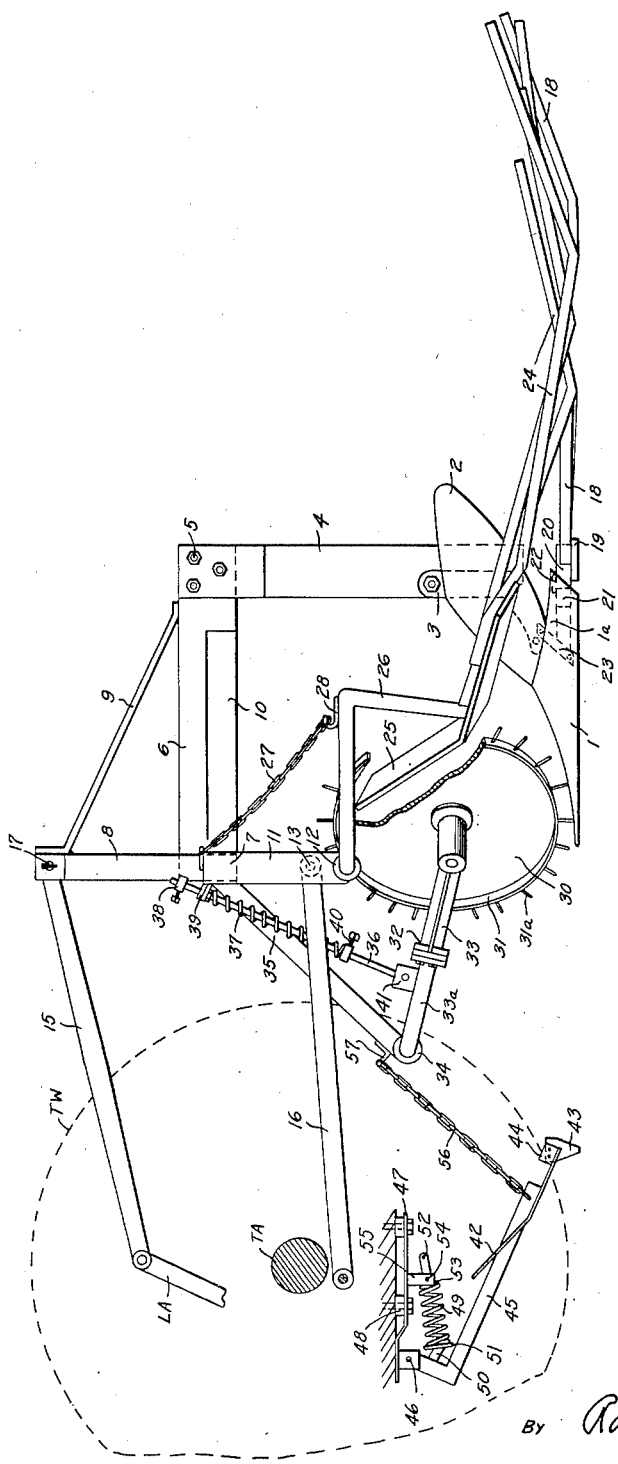

A preferred embodiment of our invention is illustrated in the accompanying drawing in which:

Figure 1 is a plan view of the entire digger arranged in operative position behind a tractor, and Figure 2 is a side elevational view of the machine, only certain parts of the tractor being illustrated in the drawing.

Referring to the drawings, our digger involves a middlebuster plow having a point 1 and usual wings 2 mounted above the point. The middlebuster is modified from conventional form by adding arm extensions 1a on each side of the point 1 to extend the sweep of the point beyond the ends of wings 2. Also, the ends of wings 2 are shortened from the conventional form by cutting about two inches from the side of each wing to prevent the soil from being thrown onto adjoining beds. As shown in Figure 1, the side arms 1a of the point 1 extend somewhat beyond the ends of the wings 2.

Standard plow mounting brackets 3 are used to attach the middlebuster assembly to a special plow beam formed of a vertical section 4 secured at its upper end by bolts 5 to the rear end of a horizontal section 6. The front end of beam section 6 is welded or otherwise secured to the middle of a cross-beam 7 which is preferably of square section. The cross-beam 7 is supported in raised position by means of a bracket formed of two inclined braces 8 having their lower ends welded or otherwise secured to the beam 7 at points near the ends of the beam, and their upper ends are secured together in spaced relation to receive the end of a control arm 15 between them. The bracket also includes an inclined brace 9 having its lower end secured to the rear end portion of beam 6 and its upper end secured to the upper ends of braces 8. The beam portion 6 is braced laterally by a pair of braces 10 connecting the rear end portion of the beam 6 with the outer end portions of the cross-beam 7, see Figure 1. Secured to each end of cross-beam 7 is a vertical arm 11 which extends downwardly from the beam and is provided with a sleeve bearing 12 at its lower end, the two bearings being arranged on a common axis parallel with cross-beam 7. Each arm 11 is connected with a part of the tractor frame by a control arm 14 pivotally secured at its rear end to the arm 11 by pin 13 near the lower end of the arm and pivotally connected to a part of the tractor frame by pin 14a. The tractor is not illustrated except that the rear axle is shown at TA and the rear wheels are shown in dotted lines at TW. The rear end of a stabilizer bar 16 is pivotally connected to each pin 13 and the forward end of each bar 16 is pivotally connected with a part of the tractor frame by a pin 16a arranged on the same axis as the pins 14a of control arms 14. Arms or bars 14 and 16 prevent side motion of the digger attachment. The forward end of the upper control bar 15 is connected to the usual lift arm LA provided on the tractor and the rear end of this bar is pivotally connected to the bracket 8—8—9 by the pin 17. It will be understood that operation of the tractor lift arm will raise the digger from contact with the ground. Members 4 to 17 inclusive constitute a frame for supporting the middlebuster plow and other parts of the digger.

Arranged immediately behind the middlebuster plow is a set of parallel rods 18 positioned to catch the soil and potatoes which fall back towards the center of the furrow. These rods slide in a horizontal position on the bottom of the furrow made by the middlebuster and are inclined upwardly at their rear ends to sift the potatoes to the top of the soil. Rods 18 are welded or otherwise secured at their forward ends to a horizontal cross-bar 19 which is connected to the plow supporting bracket by a hinged joint permitting upward tilting of the rods about a horizontal axis near the front of the cross-bar 19. One suitable hinge arrangement is illustrated in the drawing and involves a pair of hinges each being formed of two members 20 secured in spaced relation across the bar 19 near the end thereof and receiving between them the end portion of a bracket extension 23. The hinge parts 20 of each hinge are pivotally connected with the bracket extension 23 by a pivot pin 21 passing through these parts. A stop-piece 22 is welded across the upper edge of each pair of members 20 on the rear side of pin 21 and extends over the end portion of bracket extension 23 to prevent rods 18 from moving below the horizontal position but allows these rods to tilt upwardly about the axis of pin 21. The bracket extensions 23 are suitably connected with the plow-supporting bracket 3.

An additional set of parallel rods is arranged on each side of the set of rods 18, as shown at 24. These rods are positioned to catch the soil and potatoes that are thrown outwardly from the plow and into the furrow between beds. The set of rods 18 is positioned to slide upon the bottom of the furrow formed by the middlebuster, and the two sets of rods 24 are arranged to slide upon the top of the ground on either side of the furrow formed by the middlebuster. The rods 24 in each set of side rods are welded or otherwise secured at either forward ends to a slide-plate 25 arranged at an angle to the center line of the digger so that the outer end trails the inner end, as shown in Figure 1. Also, the forward ends of the rods 24 are bent upwardly at a slight angle so that the slide-plate 25 also presents an upwardly inclined surface for sliding over the top of the ground or for sliding over the vines on the ground. The inner end portion of each slide-plate 25, forming substantially one-half the length of the slide, is also bent upwardly to conform generally with the shape of the bed over which the digger is being drawn. Also, the upwardly inclined inner end of slide 25 presents a guiding surface to the vines as they are moved outwardly and guides the vines beneath the set of rods 24 as will be explained later.

As shown in Figure 2, the rear end portions of rods 24 are bent upwardly in generally the same manner as rods 18 for sifting the potatoes from the soil. While rods 24 are shown as being supported in a manner such that the middle portions of these rods are inclined upwardly towards the slides 25 and the rod rest upon the top of the ground at the bend between the middle and rear portions of each rod, they may be supported so that the middle portions are horizontal.

The slide plates 25 are supported at the end of an angle bracket 26 which is formed of a vertical section extending upwardly and outwardly from the slide 25, and a horizontal section extending forwardly and having the forward end thereof bent inwardly and journaled in bearing sleeve 12. It will be noted that bracket 26 is shaped to support the slide 25 immediately behind a vine-removing wheel 30 without interference from the wheel as the wheel moves up and down over rough ground. Each side rod assembly is thus mounted for free upward swinging movement about the axis of sleeve 12. Downward movement of each side rod assembly is limited by means of a chain 27 connected between the rear end of the horizontal section of bracket 26 and the end of cross-beam 7 so that when the digger attachment is raised by operation of the tractor lift, the side rod assembly will be picked up also. By mounting the side rod assembly in the manner described, it is possible easily to remove the side rod assembly by disconnecting chain 27 and removing a cotter pin from the journaled end of bracket 26.

The vine-removing or raking wheels 30 are formed of disc wheels having a flat outer rim 31 supporting radially extending fingers or tines 31a. These wheels are mounted for rotation on axes which are inclined to the fore-and-aft axis of the digger by approximately 50°, and they are arranged immediately in front of the upwardly inclined inner ends of the sliding plates 25. Each vine wheel is mounted on a stub axle journaled across the end of an arm 33 which is bolted at 32 to an arm extension 33a, the forward end of which extends inwardly and is journaled in a bearing sleeve 34 carried by a frame formed of two parallel channel pieces 35 secured to cross-beam 7 and extending forwardly and downwardly from this beam and being joined at their forward ends by cross-piece 57. The two vine-raking wheels are independently mounted for swinging movement about the common axis of sleeve bearings 34 so that the two wheels are free to move up and down to follow the contour of the bed. Each vine wheel is provided with an arrangement for exerting downward pressure on the wheel; this arrangement includes a slide-rod 36 pivotally connected at its power end with a bracket 41 secured to mounting arm 33a. Rod 36 passes through a compression spring 37 and through an apertured bracket 39 carried by cross-beam 7. A stop-collar 38 is provided on the upper end of rod 36 to limit the downward movement of the arm 33a when the digger is raised from contact with the ground. A moveable stop-collar 40 or rod 36 provides an abutment for the lower end of spring 37 and provides for adjustment of the amount of pressure applied to the wheel. It may be noted that the rod 36 is connected with the arm extension 33a in a forward position so that as the wheel 30 moves up and down, the rod 36 changes direction in such a way that a relatively uniform pressure is applied to the wheel 30 at all times.

A vine-cutting arrangement is carried by the tractor in front of the vine-removing wheels, and one suitable arrangement has been shown in the drawing. This arrangement includes a slide plate 42 mounted to be drawn over the bed with its front end inclined upwardly to press down the vines as the tractor moves along the bed. A pair of cutting blades 43 are mounted upon the rear end of plate 42 and are positioned on opposite sides of the row of vines to be cut. Conveniently these cutting blades may be formed of blades commonly used in reciprocating mowers and may be bolted to brackets 44 on plate 42. The slide-plate 42 is mounted in operative position upon a mounting bar 45 which is pivotally connected at 46 at its forward end to a bracket carried at the forward end of a mounting plate 47 which is bolted to a suitable part of the tractor, such as the lower face of the differential housing. Spacers 48 are interposed between the mounting plate 47 and the differential housing. The arm 45 and the plate 42 mounted thereon are urged downwardly by means of a compression spring 49 which acts against a stop-finger 50 carried by arm 45 and being seated in a cavity in cap 51 carried by the forward end of the spring 49. A bar 52 secured to cap 51 extends through spring 49 and projects through an opening spring cap 53 at the rear end of the spring. Cap 53 is pivoted on an axis 54 to bracket 55 depending from plate 47. This spring assembly is part of a standard precultivator spring arrangement. A flexible chain 56 is connected between the lower end of bar 45 and the cross-piece 57 on the digger to raise the vine cutter from contact with the ground when the digger is lifted.

In operation, the digger is drawn by the tractor along a row or bed of potatoes to be harvested. The plate 42 presses the vines against the ground and blades 43 sever the vines from their roots on opposite sides of the row. The vine-raking wheels 30 are rotated by engagement with the ground and the fingers on these wheels rake the vines outwardly away from the middlebuster. The vines are drawn by the wheels 30 beneath the inclined inner ends of slide-boards 25 and are delivered into the paths of movement of the slide-rod assemblies 24. As the slide-rod assemblies pass over the vines, the middlebuster deposits soil and potatoes upon these assemblies, the soil being sifted through the slide-rods onto the vines, and the potatoes being sifted upwardly to the surface of the soil by the upwardly inclined rear ends of the bars 24. As already explained, the set of bars 18 operates in a similar manner to separate the potatoes from the soil which is deposited upon this set of rods.

From the foregoing it would be seen that the set of sifting rods 18 mounted behind the middlebuster are pivotally attached to the plow so that they are supported entirely by the ground when in operation. The two sets of sifting rods 24 slide over the surface of the ground on each side of the plow.

It will also be noted that the arrangement for mounting the vine-cutter applies relatively uniform pressure of the cutter head against the bed in all positions of the head. Also, the arrangement for applying spring pressure to the vine-raking wheels maintains relatively uniform pressure of the wheels in contact with the ground at all times.

We claim:

1. A machine for digging sweet potatoes comprising, in combination, a supporting frame, a middlebuster plow carried by said frame, a set of parallel sifting rods mounted on said frame behind said plow, a set of parallel sifting rods positioned on opposite sides of said first set of sifting rods, each side set of sifting rods being secured at their forward ends to an individual slide-plate inclined outwardly and rearwardly from a point adjacent the tip of the middlebuster, means attaching said slide-plates to said frame to permit vertical movement of each side plate and the attached rods with respect to said frame, whereby each set of side rods are supported upon and follow the surface of the ground, a pair of vine-raking wheels, means mounting said wheels on said frame for rolling contact with the ground in front of said slide-plates, said wheels being operative by rolling engagement with the ground to rake vines outwardly from said middlebuster and underneath said slide-plates, whereby each set of side rods passes over the vines which are raked outwardly by said wheels, and a vine-cutting device mounted for movement in advance of said vine-raking wheels and being operative to sever the vines on opposite sides of a row of potatoes.

2. A potato digger according to claim 1 and including means mounting said first set of sifting rods upon said frame for pivotal movement upwardly about a horizontal axis transversely of the rods, and including means to prevent downward movement of said rods below the horizontal position.

3. A machine for digging sweet potatoes comprising, in combination, a supporting frame, a middlebuster plow carried by said frame, a set of parallel sifting rods positioned on opposite sides of said plow and extending rearwardly from said plow, each set of sifting rods being secured at their forward ends to an individual slide-plate positioned generally parallel to the adjacent wing of said middlebuster and having an upwardly inclined inner portion extending in front of said wing, means attaching said slide-plates to said frame to permit vertical movement of each slide-plate and the attached rods with respect to said frame, whereby each set of side rods are supported upon and follow the surface of the ground, a pair of vine-raking wheels, means mounting said wheels on said frame for rolling contact with the ground in front of said slide-plates, said wheels being operative by rolling engagement with the ground to rake vines outwardly from said middlebuster and underneath the upwardly inclined portions of said slide-plates.

4. A machine for digging sweet potatoes comprising, in combination, a supporting frame, a middlebuster plow carried by said frame, a set of parallel sifting rods mounted on said frame behind said plow, a set of parallel sifting rods positioned on opposite sides of said first set of sifting rods, each side set of sifting rods being secured at their forward ends to an individual slide-plate inclined outwardly and rearwardly from a point adjacent the tip of the middlebuster, means attaching said slide-plates to said frame to permit vertical movement of each slide plate and the attached rods with respect to said frame, whereby each set of side rods are supported upon and follow the surface of the ground, a pair of vine-raking wheels, and means mounting said wheels on said frame for rolling contact with the ground in front of said slide-plates, said wheels being operative by rolling engagement with the ground to rake vines outwardly from said middlebuster and underneath said slide-plates, whereby each set of side rods passes over the vines which are raked outwardly by said wheels.

5. A machine for digging sweet potatoes comprising, in combination, a supporting frame, a middlebuster plow carried by said frame, a set of parallel sifting rods positioned on opposite sides of said plow and extending rearwardly from said plow, each set of sifting rods being secured at their forward ends to an individual slide-plate positioned generally parallel to the adjacent wing of said middlebuster and having an upwardly inclined inner portion extending in front of said wing, means attaching said slide-plates to said frame to permit vertical movement of each slide-plate and the attached rods with respect to said frame, whereby each set of side rods are supported upon and follow the surface of the ground, a pair of vine-raking wheels, and means mounting said wheels on said frame for rolling contact with the ground in front of said slide-plates, said wheels being operative by rolling engagement with the ground to rake vines outwardly from said middlebuster and underneath the upwardly inclined portions of said slide-plates.

6. A machine for digging sweet potatoes comprising, in combination, a supporting frame comprising a cross-beam, a plow-beam rigidly secured to said cross-beam at the center thereof and extending horizontally and rearwardly of said cross-beam, a rigid bracket extending vertically downward from the rear end of said plow-beam, a middlebuster plow carried at the lower end of said bracket, two sets of parallel sifting rods positioned on opposite sides of said plow to receive potato-bearing soil turned outwardly by said plow, means attaching said sets of sifting rods to said cross-beam for vertical movement of the rods with respect to said frame, whereby each set of sifting rods is supported upon and follows the surface of the ground, a pair of vine-raking wheels, means secured to said cross-beam for mounting said wheels for rolling contact with the ground in front of said plow and on opposite sides thereof, said wheels being operative by rolling engagement with the ground to rake vines outwardly from said middlebuster and into positions in front of said sets of sifting rods, whereby each set of sifting rods passes over the vines which are raked outwardly by the wheels, and a vine-cutting device mounted for movement in advance of said vine-raking wheels and being operative to sever the vines on opposite sides of a row of potatoes.

7. A machine for digging sweet potatoes comprising, in combination, a supporting frame comprising a cross-beam, a plow-beam rigidly secured to said cross-beam at the center thereof and extending horizontally and rearwardly of said cross-beam, a rigid bracket extending vertically downward from the rear end of said plow-beam, a middlebuster plow carried at the lower end of said bracket, two sets of parallel sifting rods positioned on opposite sides of said plow to receive potato-bearing soil turned outwardly by said plow, means attaching said set of sifting rods to said cross-beam for vertical movement of the rods with respect to said frame, whereby each set of sifting rods is supported upon and follows the surface of the ground, a pair of vine-raking wheels, and means secured to said cross-beam for mounting said wheels for rolling contact with the ground in front of said plow and on opposite sides thereof, said wheels being operative by rolling engagement with the ground to rake vines outwardly from said middlebuster and into positions in front of said sets of sifting rods, whereby each set of sifting rods passes over the vines which are raked outwardly by the wheels.

8. A machine for digging sweet potatoes comprising, in combination, a supporting frame comprising a horizontal cross-beam having rigid arms extending downwardly from the ends thereof, a plow-beam rigidly secured to said cross-beam at the center thereof and extending horizontally and rearwardly of said cross-beam, a rigid bracket extending vertically downward from the rear end of said plow-beam, a middlebuster plow carried at the lower end of said bracket, two sets of parallel sifting rods positioned on opposite sides of said plow to receive potato-bearing soil turned outwardly by said plow, means attaching said sets of sifting rods to said downwardly extending arms for vertical movement of the rods with respect to said frame, whereby each set of sifting rods is supported upon and follows the surface of the ground, a pair of vine-raking wheels, and means secured to said cross-beam for mounting said wheels for rolling contact with the ground in front of said plow and on opposite sides thereof, said wheels being operative by rolling engagement with the ground to rake vines outwardly from said middlebuster and into positions in front of said sets of sifting rods, whereby each set of sifting rods passes over the vines which are raked outwardly by the wheels.

9. A machine for digging sweet potatoes comprising, in combination, a supporting frame comprising a cross-beam, a plow-beam rigidly secured to said cross-beam at the center thereof and extending horizontally and rearwardly of said cross-beam, a rigid bracket extending vertically downward from the rear end of said plow-beam, a middlebuster plow carried at the lower end of said bracket, two sets of parallel sifting rods positioned on opposite sides of said plow to receive potato-bearing soil turned outwardly by said plow, means attaching said sets of sifting rods to said cross-beam for vertical movement of the rods with respect to said frame, whereby each set of sifting rods is supported upon and follows the surface of the ground, a pair of vine-raking wheels, means secured to said cross-beam for mounting said wheels for rolling contact with the ground in front of said plow and on opposite sides thereof, comprising a bracket rigidly secured to said cross-beam near the center thereof and extending downwardly and forwardly of said cross-beam, a pair of arms each having one of said wheels journalled at one end thereof on an axis transversely of the arm axis, means pivotally supporting the other end of each arm on the forward end of said last-mentioned bracket on an axis parallel with said cross-beam, each said arm extending outwardly and rearwardly from its pivotal axis, said wheels being operative by rolling engagement with the ground to rake vines outwardly from said middlebuster and into positions in front of said sets of sifting rods, whereby each set of sifting rods passes over the vines which are raked outwardly by the wheels.

JOSEPH K. PARK.
MITCHELL R. POWERS.

References Cited in the file of this patent

UNITED STATES PATENTS

| Number | Name | Date |
|---|---|---|
| 1,031,356 | Massart | July 2, 1912 |
| 1,530,005 | Lytle | Mar. 17, 1925 |
| 1,531,907 | Edmonds | Mar. 31, 1925 |
| 2,447,354 | Morrill | Aug. 17, 1948 |
| 2,466,555 | Paine et al. | Apr. 5, 1949 |

FOREIGN PATENTS

| Number | Country | Date |
|---|---|---|
| 620,980 | Great Britain | Apr. 1, 1949 |